US007763341B2

(12) United States Patent
Brown

(10) Patent No.: US 7,763,341 B2
(45) Date of Patent: Jul. 27, 2010

(54) FILLED POLYMER COMPOSITE AND SYNTHETIC BUILDING MATERIAL COMPOSITIONS

(75) Inventor: Wade Brown, Fort Myers, FL (US)

(73) Assignee: Century-Board USA, LLC, Mooresville, NC (US)

( * ) Notice: Subject to any disclaimer, the term of this patent is extended or adjusted under 35 U.S.C. 154(b) by 0 days.

(21) Appl. No.: 10/764,012

(22) Filed: Jan. 23, 2004

(65) Prior Publication Data

US 2005/0163969 A1    Jul. 28, 2005

(51) Int. Cl.
C08K 3/18    (2006.01)
(52) U.S. Cl. ................... 428/151; 524/430; 524/590
(58) Field of Classification Search ................. 428/151, 428/304.4; 524/430, 590
See application file for complete search history.

(56) References Cited

U.S. PATENT DOCUMENTS

| | | | |
|---|---|---|---|
| 2,983,693 A | 5/1961 | Sievers |
| 3,071,297 A | 1/1963 | Lee |
| 3,466,705 A | 9/1969 | Richie |
| 3,644,168 A | 2/1972 | Bonk et al. |
| 3,698,731 A | 10/1972 | Jost et al. |
| 3,726,624 A | 4/1973 | Schwarz |
| 3,738,895 A | 6/1973 | Paymal |
| 3,764,247 A | 10/1973 | Garrett et al. |
| 3,802,582 A | 4/1974 | Brock |
| 3,819,574 A | 6/1974 | Brown et al. |
| 3,824,057 A | 7/1974 | Kornylak et al. |
| 3,830,776 A | 8/1974 | Carlson et al. |
| 3,867,494 A | 2/1975 | Rood et al. |
| 3,917,547 A | 11/1975 | Massey |
| 3,917,774 A | 11/1975 | Sagane et al. |
| 3,981,654 A | 9/1976 | Rood et al. |
| 3,991,005 A | 11/1976 | Wallace |
| 4,005,035 A * | 1/1977 | Deaver ..................... 521/51 |
| 4,065,410 A | 12/1977 | Schäfer et al. |
| 4,073,840 A | 2/1978 | Saidla |
| 4,092,276 A | 5/1978 | Narayan |
| 4,137,200 A | 1/1979 | Wood et al. |
| 4,141,862 A | 2/1979 | Raden |
| 4,153,768 A | 5/1979 | Blount |
| 4,160,749 A | 7/1979 | Schneider et al. |
| 4,163,824 A | 8/1979 | Saidla |
| 4,164,526 A | 8/1979 | Clay et al. |
| 4,165,414 A | 8/1979 | Narayan et al. |
| 4,180,538 A | 12/1979 | Morikawa et al. |
| 4,210,572 A | 7/1980 | Herman et al. |
| 4,221,877 A | 9/1980 | Cuscurida et al. |
| 4,243,755 A | 1/1981 | Marx et al. |
| 4,247,656 A | 1/1981 | Janssen |
| 4,248,975 A | 2/1981 | Satterly |
| 4,251,428 A | 2/1981 | Recker et al. |
| 4,254,002 A | 3/1981 | Sperling et al. |
| 4,254,176 A | 3/1981 | Müller et al. |
| 4,256,846 A | 3/1981 | Ohasi et al. |
| 4,260,538 A | 4/1981 | Iseler et al. |
| 4,261,946 A | 4/1981 | Goyert et al. |
| 4,272,377 A | 6/1981 | Gerlach et al. |
| 4,275,033 A | 6/1981 | Schulte et al. |
| 4,276,337 A | 6/1981 | Coonrod |
| 4,282,988 A | 8/1981 | Hulber, Jr. |
| 4,300,776 A | 11/1981 | Taubenmann |
| 4,330,494 A | 5/1982 | Iwata et al. |
| 4,331,726 A | 5/1982 | Cleary |
| 4,338,422 A | 7/1982 | Jackson, Jr. et al. |
| 4,339,366 A | 7/1982 | Blount |
| 4,342,847 A | 8/1982 | Goyert et al. |
| 4,344,873 A | 8/1982 | Wick |
| 4,359,359 A | 11/1982 | Gerlach et al. |
| 4,359,548 A | 11/1982 | Blount |
| 4,366,204 A | 12/1982 | Briggs |
| 4,367,259 A | 1/1983 | Fulmer et al. |
| 4,376,171 A | 3/1983 | Blount |

(Continued)

FOREIGN PATENT DOCUMENTS

CA    2 037 130 C    1/2006

(Continued)

OTHER PUBLICATIONS

MULTRANOL 4035, Bayer Material Science Product Information, Jan. 1997.*

(Continued)

*Primary Examiner*—Alicia Chevalier
(74) *Attorney, Agent, or Firm*—Knobbe, Martens, Olson & Bear LLP

(57) ABSTRACT

The invention relates to composite compositions having a matrix of polymer networks and dispersed phases of particulate or fibrous materials. The polymer matrix contains a polyurethane network formed by the reaction of a poly- or diisocyanate and one or more saturated polyether or polyester polyols, and an optional polyisocyanurate network formed by the reaction of optionally added water and isocyanate. The matrix is filled with a particulate phase, which can be selected from one or more of a variety of components, such as fly ash particles, axially oriented fibers, fabrics, chopped random fibers, mineral fibers, ground waste glass, granite dust, or other solid waste materials. The addition of water can also serve to provide a blowing agent to the reaction mixture, resulting in a foamed structure, if such is desired.

43 Claims, No Drawings

U.S. PATENT DOCUMENTS

| | | |
|---|---|---|
| 4,390,581 A | 6/1983 | Cogswell et al. |
| 4,395,214 A | 7/1983 | Phipps et al. |
| 4,397,983 A | 8/1983 | Hill et al. |
| 4,412,033 A | 10/1983 | LaBelle et al. |
| 4,439,548 A * | 3/1984 | Weisman ............... 521/130 |
| 4,460,737 A | 7/1984 | Evans et al. |
| 4,483,727 A | 11/1984 | Eickman |
| 4,576,718 A | 3/1986 | Reischl et al. |
| 4,595,709 A | 6/1986 | Reischl |
| 4,597,927 A | 7/1986 | Zeitler et al. |
| 4,604,410 A | 8/1986 | Altenberg |
| 4,649,162 A | 3/1987 | Roche et al. |
| 4,661,533 A | 4/1987 | Stobby |
| 4,677,157 A | 6/1987 | Jacobs |
| 4,680,214 A | 7/1987 | Frisch et al. |
| 4,714,778 A | 12/1987 | Burgoyne, Jr. et al. |
| 4,780,484 A | 10/1988 | Schubert et al. |
| 4,780,498 A | 10/1988 | Goerrissen et al. |
| 4,795,763 A | 1/1989 | Gluck et al. |
| 4,802,769 A | 2/1989 | Tanaka |
| 4,826,944 A | 5/1989 | Hoefer et al. |
| 4,835,195 A | 5/1989 | Rayfield et al. |
| 4,855,184 A | 8/1989 | Klun et al. |
| 4,892,891 A | 1/1990 | Close |
| 4,895,352 A | 1/1990 | Stumpf |
| 4,948,859 A | 8/1990 | Echols et al. |
| 5,001,165 A | 3/1991 | Canaday et al. |
| 5,010,112 A | 4/1991 | Glicksman et al. |
| 5,028,648 A | 7/1991 | Famili et al. |
| 5,051,222 A | 9/1991 | Marten et al. |
| 5,053,274 A | 10/1991 | Jonas |
| 5,091,436 A | 2/1992 | Frisch et al. |
| 5,096,993 A | 3/1992 | Smith et al. |
| 5,102,918 A | 4/1992 | Moriya |
| 5,102,969 A | 4/1992 | Scheffler et al. |
| 5,114,630 A | 5/1992 | Newman et al. |
| 5,149,722 A | 9/1992 | Soukup |
| 5,159,012 A | 10/1992 | Doesburg et al. |
| 5,166,301 A | 11/1992 | Jacobs |
| 5,167,899 A | 12/1992 | Jezic |
| 5,185,420 A | 2/1993 | Smith et al. |
| 5,252,697 A | 10/1993 | Jacobs et al. |
| 5,296,545 A | 3/1994 | Heise |
| 5,300,531 A | 4/1994 | Weaver |
| 5,302,634 A | 4/1994 | Mushovic |
| 5,330,341 A | 7/1994 | Kemerer et al. |
| 5,331,044 A | 7/1994 | Lausberg et al. |
| 5,344,490 A | 9/1994 | Roosen et al. |
| 5,361,945 A | 11/1994 | Johanson |
| 5,369,147 A | 11/1994 | Mushovic |
| 5,424,013 A | 6/1995 | Lieberman |
| 5,424,014 A | 6/1995 | Glorioso et al. |
| 5,432,204 A | 7/1995 | Farkas |
| 5,439,711 A | 8/1995 | Vu et al. |
| 5,455,312 A | 10/1995 | Heidingsfeld et al. |
| 5,491,174 A | 2/1996 | Grier et al. |
| 5,508,315 A | 4/1996 | Mushovic |
| 5,532,065 A | 7/1996 | Gübitz et al. |
| 5,536,781 A | 7/1996 | Heidingsfeld et al. |
| 5,554,713 A | 9/1996 | Freeland |
| 5,565,497 A | 10/1996 | Godbey et al. |
| 5,567,791 A | 10/1996 | Brauer et al. |
| 5,569,713 A | 10/1996 | Lieberman |
| 5,604,266 A | 2/1997 | Mushovic |
| 5,611,976 A | 3/1997 | Klier et al. |
| 5,621,024 A | 4/1997 | Eberhardt et al. |
| 5,631,103 A | 5/1997 | Eschbach et al. |
| 5,631,319 A | 5/1997 | Reese et al. |
| 5,643,516 A | 7/1997 | Raza et al. |
| 5,681,915 A | 10/1997 | Lechner et al. |
| 5,688,890 A | 11/1997 | Ishiguro et al. |
| 5,696,205 A | 12/1997 | Müller et al. |
| 5,723,506 A | 3/1998 | Glorioso et al. |
| 5,759,695 A | 6/1998 | Primeaux, II |
| 5,760,133 A | 6/1998 | Heidingsfeld et al. |
| 5,783,125 A | 7/1998 | Bastone et al. |
| 5,783,629 A | 7/1998 | Srinivasan et al. |
| 5,795,949 A | 8/1998 | Daute et al. |
| 5,811,506 A | 9/1998 | Slagel |
| 5,817,402 A | 10/1998 | Miyake et al. |
| 5,908,701 A | 6/1999 | Jennings et al. |
| 5,929,153 A | 7/1999 | Mori et al. |
| 5,945,460 A | 8/1999 | Ekart et al. |
| 5,952,053 A | 9/1999 | Colby |
| 5,962,144 A | 10/1999 | Primeaux, II |
| 5,981,655 A | 11/1999 | Heidingsfeld et al. |
| 6,020,387 A | 2/2000 | Downey et al. |
| 6,040,381 A | 3/2000 | Jennings et al. |
| 6,051,634 A | 4/2000 | Laas et al. |
| 6,055,781 A | 5/2000 | Johanson |
| 6,086,802 A | 7/2000 | Levera et al. |
| 6,096,401 A | 8/2000 | Jenkines |
| 6,103,340 A | 8/2000 | Kubo et al. |
| 6,107,355 A | 8/2000 | Horn et al. |
| 6,107,433 A | 8/2000 | Petrovic et al. |
| 6,120,905 A | 9/2000 | Flvovsky |
| 6,136,870 A | 10/2000 | Triolo et al. |
| 6,140,381 A | 10/2000 | Rosthauser et al. |
| 6,177,232 B1 | 1/2001 | Melisaris et al. |
| 6,180,192 B1 | 1/2001 | Smith et al. |
| 6,180,686 B1 | 1/2001 | Kurth |
| RE37,095 E | 3/2001 | Glorioso et al. |
| 6,204,312 B1 | 3/2001 | Taylor |
| 6,211,259 B1 | 4/2001 | Borden et al. |
| 6,224,797 B1 | 5/2001 | Franzen et al. |
| 6,252,031 B1 | 6/2001 | Tsutsumi et al. |
| 6,257,643 B1 | 7/2001 | Young |
| 6,257,644 B1 | 7/2001 | Young |
| 6,258,310 B1 | 7/2001 | Sardanopoli et al. |
| 6,258,917 B1 | 7/2001 | Slagel |
| 6,284,841 B1 | 9/2001 | Friesner |
| 6,294,637 B1 | 9/2001 | Braüer et al. |
| 6,297,321 B1 | 10/2001 | Onder et al. |
| 6,309,507 B1 | 10/2001 | Morikawa et al. |
| 6,348,514 B1 | 2/2002 | Calabrese et al. |
| 6,387,504 B1 | 5/2002 | Mushovic |
| 6,409,949 B1 | 6/2002 | Tanaka et al. |
| 6,429,257 B1 | 8/2002 | Buxton et al. |
| 6,432,335 B1 | 8/2002 | Ladang et al. |
| 6,433,032 B1 | 8/2002 | Hamilton |
| 6,433,121 B1 | 8/2002 | Petrovic et al. |
| 6,455,605 B1 | 9/2002 | Giorgini et al. |
| 6,455,606 B1 | 9/2002 | Kaku et al. |
| 6,458,866 B1 | 10/2002 | Oppermann et al. |
| 6,465,569 B1 | 10/2002 | Kurth |
| 6,469,667 B2 | 10/2002 | Fox et al. |
| 6,485,665 B1 | 11/2002 | Hermanutz et al. |
| 6,534,617 B1 | 3/2003 | Batt et al. |
| 6,541,534 B2 | 4/2003 | Allen et al. |
| 6,552,660 B1 | 4/2003 | Lisowski |
| 6,555,199 B1 | 4/2003 | Jenkines |
| 6,573,309 B1 | 6/2003 | Reitenbach et al. |
| 6,573,354 B1 | 6/2003 | Petrovic et al. |
| 6,605,343 B1 | 8/2003 | Motoi et al. |
| 6,616,886 B2 | 9/2003 | Peterson et al. |
| 6,617,009 B1 | 9/2003 | Chen et al. |
| 6,624,244 B2 | 9/2003 | Kurth |
| 6,649,084 B2 | 11/2003 | Morikawa et al. |
| 6,649,667 B2 | 11/2003 | Clatty |
| 6,686,435 B1 | 2/2004 | Petrovic et al. |
| 6,695,902 B2 | 2/2004 | Hemmings et al. |
| 6,706,774 B2 | 3/2004 | Münzenberger et al. |
| 6,769,220 B2 | 8/2004 | Friesner |
| 6,832,430 B1 | 12/2004 | Ogawa et al. |

| | | | | | | |
|---|---|---|---|---|---|---|
| 6,849,676 | B1 | 2/2005 | Shibano et al. | DE | 2351844 A | 4/1975 |
| 6,864,296 | B2 | 3/2005 | Kurth | GB | 2347933 | 9/2000 |
| 6,867,239 | B2 | 3/2005 | Kurth | JP | 355080456 A | 6/1980 |
| 6,871,457 | B2 | 3/2005 | Quintero-Flores et al. | JP | 58-132533 | 8/1983 |
| 6,881,763 | B2 | 4/2005 | Kurth | JP | 63-22819 | 1/1988 |
| 6,881,764 | B2 | 4/2005 | Doesburg et al. | JP | 63-202408 | 8/1988 |
| 6,903,156 | B2 | 6/2005 | Müller et al. | JP | 5-285941 | 11/1993 |
| 6,908,573 | B2 | 6/2005 | Hossan | JP | 7-76395 | 3/1995 |
| 6,916,863 | B2 | 7/2005 | Hemmings et al. | JP | 7-313941 | 12/1995 |
| 6,962,636 | B2 | 11/2005 | Kurth et al. | JP | 8-188634 | 7/1996 |
| 6,971,495 | B2 | 12/2005 | Hedrick et al. | JP | 11-171960 | 6/1999 |
| 6,979,477 | B2 | 12/2005 | Kurth et al. | JP | 2004-131654 | 4/2004 |
| 6,979,704 | B1 | 12/2005 | Mayer et al. | JP | 2005-138567 | 6/2005 |
| 6,989,123 | B2 | 1/2006 | Lee et al. | KR | 2002086327 A | 11/2002 |
| 6,997,346 | B2 | 2/2006 | Landers et al. | NZ | 226301 | 3/1990 |
| 7,063,877 | B2 | 6/2006 | Kurth et al. | WO | WO 81/03026 | 10/1981 |
| 7,132,459 | B1 | 11/2006 | Buchel | WO | WO 87/05541 | 9/1987 |
| 7,160,976 | B2 | 1/2007 | Lühmann et al. | WO | WO 91/00304 | 1/1991 |
| 7,188,992 | B2 | 3/2007 | Mattingly, Jr. | WO | WO 92/07892 | 5/1992 |
| 7,196,124 | B2 | 3/2007 | Parker et al. | WO | WO 93/19110 | 9/1993 |
| 7,316,559 | B2 | 1/2008 | Taylor | WO | WO 93/24549 | 12/1993 |
| 2002/0034598 | A1 | 3/2002 | Bonk et al. | WO | WO 94/25529 | 11/1994 |
| 2002/0045048 | A1 | 4/2002 | Bonk et al. | WO | WO 94/27697 | 12/1994 |
| 2002/0048643 | A1 | 4/2002 | Bonk et al. | WO | WO 97/11114 A1 | 3/1997 |
| 2002/0171164 | A1 | 11/2002 | Halterbaum et al. | WO | WO 97/44373 | 11/1997 |
| 2002/0192456 | A1 | 12/2002 | Mashburn et al. | WO | WO 98/08893 A1 | 5/1998 |
| 2003/0021915 | A1 | 1/2003 | Rohatgi et al. | WO | WO 99/39891 | 8/1999 |
| 2003/0083394 | A1 | 5/2003 | Clatty | WO | WO 00/17249 | 3/2000 |
| 2003/0090016 | A1 | 5/2003 | Petrovic et al. | WO | WO 01/72863 | 10/2001 |
| 2003/0143910 | A1 | 7/2003 | Mashburn et al. | WO | WO 02/01530 | 1/2002 |
| 2003/0158365 | A1 | 8/2003 | Brauer et al. | WO | WO 2004/078900 | 9/2004 |
| 2003/0232933 | A1 | 12/2003 | Lagneaux et al. | WO | WO 2004/113248 A2 | 12/2004 |
| 2004/0049002 | A1 | 3/2004 | Andrews et al. | WO | WO 2005/053938 | 6/2005 |
| 2004/0121161 | A1 | 6/2004 | Shugert et al. | WO | WO 2005/056267 | 6/2005 |
| 2004/0144287 | A1 | 7/2004 | Tardif et al. | WO | WO 2005/072188 A2 | 8/2005 |
| 2004/0198900 | A1 | 10/2004 | Madaj | WO | WO 2005/072188 A3 | 8/2005 |
| 2004/0266993 | A1 | 12/2004 | Evans | WO | WO 2005/094255 | 10/2005 |
| 2005/0031578 | A1 | 2/2005 | Deslauriers et al. | WO | WO 2005/123798 | 12/2005 |
| 2005/0079339 | A1 | 4/2005 | Riddle | WO | WO 2007/112104 | 10/2007 |
| 2005/0131092 | A1 | 6/2005 | Kurth et al. | WO | WO 2007/112105 | 10/2007 |
| 2005/0131093 | A1 | 6/2005 | Kurth et al. | | | |
| 2005/0163969 | A1 | 7/2005 | Brown | | | |
| 2005/0171243 | A1 | 8/2005 | Hemmings et al. | | | |
| 2005/0182228 | A1 | 8/2005 | Kurth | | | |
| 2005/0222303 | A1 | 10/2005 | Cernohous | | | |
| 2005/0260351 | A1 | 11/2005 | Kurth et al. | | | |
| 2005/0281999 | A1 | 12/2005 | Hoffman et al. | | | |
| 2006/0014891 | A1 | 1/2006 | Yang et al. | | | |
| 2006/0041155 | A1 | 2/2006 | Casper | | | |
| 2006/0041156 | A1 | 2/2006 | Casper et al. | | | |
| 2006/0045899 | A1 | 3/2006 | Sarangapani | | | |
| 2006/0105145 | A1 | 5/2006 | Brown | | | |
| 2006/0115625 | A1 | 6/2006 | Brown | | | |
| 2006/0186571 | A1 | 8/2006 | Brown | | | |
| 2006/0186572 | A1 | 8/2006 | Brown | | | |
| 2006/0217517 | A1 | 9/2006 | Daly | | | |
| 2006/0270747 | A1 | 11/2006 | Griggs | | | |
| 2006/0273486 | A1 | 12/2006 | Taylor | | | |
| 2007/0027227 | A1 | 2/2007 | Shutov | | | |
| 2007/0037953 | A1 | 2/2007 | Geiger et al. | | | |
| 2007/0066697 | A1 | 3/2007 | Gilder et al. | | | |
| 2007/0222105 | A1 | 9/2007 | Brown | | | |
| 2007/0222106 | A1 | 9/2007 | Brown | | | |
| 2007/0225391 | A1 | 9/2007 | Brown | | | |
| 2007/0225419 | A1 | 9/2007 | Brown | | | |
| 2008/0029925 | A1 | 2/2008 | Brown | | | |
| 2008/0132611 | A1 | 6/2008 | Brown | | | |

FOREIGN PATENT DOCUMENTS

| | | |
|---|---|---|
| CN | 1251596 A | 4/2000 |
| CN | 1052991 C | 5/2000 |
| CN | 1926282 A | 3/2007 |

OTHER PUBLICATIONS

MULTRANOL 3900, Bayer Material Science Product Information, Jan. 2006.*

ARCOL LG-56, Bayer Material Science Product Information, Sep. 2003.*

Deposition of Thomas E. Jurgensen, pp. 1-407 (Jan. 9, 2006)—Redacted.

Deposition of Daniel Klempner, pp. 1-120 (Jan. 6, 2006)—Redacted.

Summary of Opinions, Daniel Klempner, pp. 1-11 (Jan. 4, 2006).

Deposition of John R Taylor, pp. 1-388 (Dec. 7, 2005)—Redacted.

Deposition of Fyodor Shutov vol. 1, pp. 1-312 (Dec. 15, 2005)—Redacted.

Deposition of Fyodor Shutov vol. 2, pp. 1-182 (Dec. 28, 2005)—Redacted.

Deposition of Wade Brown vol. 1, pp. 1-212 (Nov. 17, 2005)—Redacted.

Deposition of Wade Brown vol. 2, pp. 1-256 (Nov. 18, 2005)—Redacted.

Deposition of Wade Brown vol. 3, pp. 1-302 (Nov. 21, 2005)—Redacted.

Deposition of Edward J. Butteriss vol. 1, pp. 1-501 (Dec. 16, 2005).

Deposition of Edward J. Butteriss vol. 2, pp. 1-195 (Dec. 28, 2005).

Deposition of Zachary R. Taylor vol. 1, pp. 1-221 (Dec. 29, 2005)—Redacted.

Deposition of Zachary R. Taylor vol. 2, pp. 1-285 (Jan. 5, 2006)—Redacted.

Bayer Material Science, Product Index—Polyurethane Raw Materials Prepolymers and Systems (2006).

Bayer Material Science, Multranol 4035—Polyether Polyol, CAS No. 9049-71-2, Product Code: K114 (1997).

Bayer Material Science, Arcol LG-56—Polyether Polyol, CAS No. 25791-96-2, Product Code: KLLG56 (2003).
Bayer Material Science, Multranol 3900—Polyether Polyol (2006).
Tenibac-Graphion, Inc., Texturing Technologists, Brochure, Oct. 1, 1997.
Krishnamurthi, B, et al.., Nano- and Micro-Fillers for Polyurethane Foams: Effect on Density and Mechanical Properties, Symposium, Sep. 30-Oct. 3, 2001, pp. 239-244, Polyurethanes Expo 2001, Columbus, OH.
Nosker, Thomas J., et al., Fiber Orientation and Creation of Structural Plastic Lumber, Plastics Engineering, Jun. 1999, pp. 53-56.
Bledzki, Andrzej K., et al., Impact Properties of Natural Fiber-Reinforced Epoxy Foams, Journal of Cellular Plastics; vol. 35, Nov. 1999, pp. 550-562.
Frisch, K.C., et al., Hybrid IPN-Foam Composites, Cellular Polymers, Papers from a Three-day International Conference organized by Rapra Technology Limited, Mar. 20-22, 1991.
Shutov, F.A., Excerpts from Integral/Structural Polymer Foams: Technology, Properties and Applications, 1986, Pages including preface, 3-4, 8-9, 13, 23-25, 131-134, 153-158, 167, 171, 176-179, 256.
Klempner, D., ed., et al., Excerpts from Handbook of Polymeric Foams and Foam Technology, 2d ed., 2004, pp. 121-124, 126, 128, 129, Hanser Publishers, Munich.
Randall, D., ed., et. al., Excerpts from "The polyurethanes book", 2002, pp. 1, 166-167, 210-213, 229-231, 263-264, Dunholm Publicity Ltd., United Kingdom.
Woods, G., Excerpts from "The ICI Polyurethanes Book", 1987, pp. 119-120, 127, 135-140, 158-159, The Netherlands.
Wypych, G., Excerpts from "Fillers", 1993, pp. 4, 48, 57, ChemTech Publishing, Ontario Canada.
Elias, H., Excerpts from "An Introduction to Polymer Science", 1997, pp. 408-409, VCH Publishers, Inc., New York, NY.
Chawla, K. K., Excerpts from "Composite Materials: Science and Engineering", 1987, pp. 89-92, Spring Verlag, New York, NY.
National Center for Environmental Research and Quality Assurance, Office of Research and Development, U.S. Environmental Protection Agency, Abstract of "The Use of Multi-Component Waste Products for Use in Roofing Materials," May 9, 1998.
Energy Efficient Building Products from Waste Materials, Development and Demonstration Project, Proposal, Sep. 10, 1999, NYS Energy Research & Development Authority.
Foamed Recyclables: New Process Efficiently Transforms Solid Waste into Synthetic Building Materials, Jan. 2002, United States Department of Energy, Office of Industrial Technologies, Inventions and Innovations Program.
"Achieving a Wood Grain Finish Effect," dated Dec. 11, 2003, http://www.sculpt.com/technogtes/woodgrainfinish.htm.
Guo et al., "Rigid Urethane Foams from a Soy Polyol-Dod Hybrid," USDA Agricultural Research Service, http://ars.usda.gov/research/publications/publications.htm?SEQ_NO_115=145249 (May 9, 2003).
Guo et al., "Polyols and Polyurethanes from Hydroformylation of Soybean Oil," Journal of Polymers and the Environment 10(1-2):49-52 (Apr. 2002).
Petrovic et al., "Industrial Oil Products Program," AOCS Archives, (2007).
International Search Report issued in International Application No. PCT/US2007/007468 on Nov. 19, 2007.
International Search Report Issued in International Application No. PCT/US2007/007470 on Nov. 19, 2007.
Past, present, and future office actions, amendments, arguments, and other relevant documents or materials in the file history of co-pending U.S. Appl. No. 11/407,416, filed Apr. 20, 2006, entitled Filled Polymer Composite and Synthetic Building Material Compositions.
Past, present, and future office actions, amendments, arguments, and other relevant documents or materials in the file history of co-pending U.S. Appl. No. 11/407,661, filed Apr. 20, 2006, entitled Filled Polymer Composite and Synthetic Building Material Compositions.
Past, present, and future office actions, amendments, arguments, and other relevant documents or materials in the file history of co-pending U.S. Appl. No. 11/841,901, filed Apr. 20, 2007, entitled Filled Polymer Composite and Synthetic Building Material Compositions.
Past, present, and future office actions, amendments, arguments, and other relevant documents or materials in the file history of co-pending U.S. Appl. No. 11/317,494, filed Dec. 22, 2005, entitled Filled Polymer Composite and Synthetic Building Material Compositions.
Past, present, and future office actions, amendments, arguments, and other relevant documents or materials in the file history of co-pending U.S. Appl. No. 11/317,958, filed Dec. 22, 2005, entitled Filled Polymer Composite and Synthetic Building Material Compositions.
Past, present, and future office actions, amendments, arguments, and other relevant documents or materials in the file history of co-pending U.S. Appl. No. 12/361,488, filed Jan. 28, 2009, entitled Continuous Forming System Utilizing Up to Six Endless Belts.
Past, present, and future office actions, amendments, arguments, and other relevant documents or materials in the file history of co-pending U.S. Appl. No. 11/593,316, filed Nov. 6, 2006, entitled Method for Molding Three-Dimensional Foam Products Using a Continuous Forming Apparatus.
Past, present, and future office actions, amendments, arguments, and other relevant documents or materials in the file history of co-pending U.S. Appl. No. 11/691,438, filed Mar. 26, 2007, entitled Polyurethane Composite Materials.
Past, present, and future office actions, amendments, arguments, and other relevant documents or materials in the file history of co-pending U.S. Appl. No. 11/691,449, filed Mar. 26, 2007, entitled Polyurethane Composite Materials.
Past, present, and future office actions, amendments, arguments, and other relevant documents or materials in the file history of co-pending U.S. Appl. No. 11/691,451, filed Mar. 26, 2007, entitled Polyurethane Composite Materials.
Past, present, and future office actions, amendments, arguments, and other relevant documents or materials in the file history of co-pending U.S. Appl. No. 11/691,446, filed Mar. 26, 2007, entitled Extrusion of Polyurethane Composite Materials.
Past, present, and future office actions, amendments, arguments, and other relevant documents or materials in the file history of co-pending U.S. Appl. No. 11/691,456, filed Mar. 26, 2007, entitled Extrusion of Polyurethane Composite Materials.
Jan. 22, 2009 European Supplemental Search Report Appln No. 05711595.8-2115/1716283 PCT/US2005001570.
Aug. 3, 2006 International Search Report for PCT/US05/01570 filing date Jan. 21, 2005.
Oct. 6, 2008 Office Action in U.S. Appl. No. 11/317,958, filed Dec. 22, 2005.
Nov. 7, 2008 Office Action in U.S. Appl. No. 11/407,416, filed Apr. 20, 2006.
Nov. 7, 2008 Office Action in U.S. Appl. No. 11/407,661, filed Apr. 20, 2006.
Winkler, Non-Final Rejection of U.S. Appl. No. 11/691,449, Jun. 30, 2008.
Winkler, Non-Final Rejection of U.S. Appl. No. 11/691,451, Jun. 27, 2008.
Urethane Soy Systems Company, Material Safety Data Sheet, Soy Therm 50 A-Side, Jul. 29, 2005.
Urethane Soy Systems Company, Material Safety Data Sheet, Soy Therm 50 B-Side, Jul. 29, 2005.
Pollack, Soy v. Petro Polyols, A Life Cycle Comparison, Omni Tech International, Ltd., Feb. 2004.
Chevalier, Non-Final Rejection of U.S. Appl. No. 11/317,494, Mar. 26, 2009.
Co-pending U.S. Appl. No. 11/417,385, filed May 4, 2006, titled Continuous Forming System Utilizing Up to Six Endless Belts, and assigned to the assignee of this application.
Supplemental Information Disclosures Statement filed in U.S. Appl. No. 11/165,071 on Apr. 19, 2007.

* cited by examiner

FILLED POLYMER COMPOSITE AND SYNTHETIC BUILDING MATERIAL COMPOSITIONS

BACKGROUND OF THE INVENTION

1. Field of the Invention

The invention relates to composite compositions having matrices of polymer networks and dispersed phases of particulate and/or fibrous materials, which have excellent mechanical properties, rendering them suitable for use in load bearing applications, such as in building materials. The composites are stable to weathering, can be molded and colored to desired functional and aesthetic characteristics, and are environmentally friendly, since they can make use of recycled particulate or fibrous materials as the dispersed phase.

2. Description of Related Art

Polymeric composite materials that contain organic or inorganic filler materials have become desirable for a variety of uses because of their excellent mechanical properties, weathering stability, and environmental friendliness.

These materials can be are relatively low density, due to their foaming, or high density when unfoamed, but are extremely strong, due to the reinforcing particles or fibers used throughout. Their polymer content also gives them good toughness (i.e., resistance to brittle fracture), and good resistance to degradation from weathering when they are exposed to the environment. This combination of properties renders some polymeric composite materials very desirable for use in building materials, such as roofing materials, decorative or architectural products, outdoor products, insulation panels, and the like.

In addition, the filler materials used need not be virgin materials, and can desirably be recycled fibers or particulates formed as waste or by-product from industrial processes. Polymeric composites allow these materials to be advantageously reused, rather than present disposal problems.

Filled composite polymeric materials have been described in U.S. Pat. Nos. 5,302,634; 5,369,147; 5,548,315; and 5,604,260, the contents of each of which is incorporated herein by reference. However, the materials disclosed in these patents all use polyester polyurethane resins that are formed as the reaction products of unsaturated polyester polyols, saturated polyols, poly- or di-isocyanates, and a reactive monomer, such as styrene. The number of different reactants, and the complexity of the resulting process chemistry, adds increased cost to the preparation of these materials, both through added costs for materials inputs and through added capital costs for additional process equipment.

A filled closed cell foam material is disclosed in U.S. Pat. No. 4,661,533 (Stobby), but provides much lower densities than are desirable for structural building products. Moreover, Stobby does not disclose or suggest a composite material that is "self-skinning," i.e., that forms a continuous skin on the surface of the material that covers and protects the material underneath, which is porous, and subject to visible scratching.

SUMMARY OF THE INVENTION

It has been found, however, that a highly filled, foamed or unfoamed composite polymeric material having good mechanical properties can be obtained without the need for all of the components required in the patents cited above. This results in a substantial decrease in cost, because of decreased materials cost, and because of decreased complexity of the process chemistry, leading to decreased capital investment in process equipment.

In one embodiment, the invention relates to composite compositions having a matrix of polymer networks and dispersed phases of particulate or fibrous materials. The polymer matrix contains a polyurethane network formed by the reaction of a poly- or di-isocyanate and one or more saturated polyether or polyester polyols, and an optional polyisocyanurate network formed by the reaction of optionally added water and isocyanate. The matrix is filled with a particulate phase, which can be selected from one or more of a variety of components, such as fly ash particles, axially oriented fibers, fabrics, chopped random fibers, mineral fibers, ground waste glass, granite dust, or other solid waste materials. The addition of water can also serve to provide a blowing agent to the reaction mixture, resulting in a foamed structure, if such is desired.

The composite material of the invention is advantageously used as structural building material, and in particular as synthetic lumber, for several reasons. First, it has the desired density, even when foamed, to provide structural stability and strength. Second, the composition of the material can be easily tuned to modify its properties by, e.g., adding oriented fibers to increase flexural stiffness, or by adding pigment or dyes to hide the effects of scratches. This can be done even after the material has been extruded. Third, the material is self-skinning, forming a tough, slightly porous layer that covers and protects the more porous material beneath. This tough, continuous, highly adherent skin provides excellent water and scratch resistance. In addition, as the skin is forming, an ornamental pattern (e.g., a simulated wood grain) can be impressed on it, increasing the commercial acceptability of products made from the composite.

In a more specific embodiment, the invention relates to a polymer matrix composite material, comprising:

(1) a polyurethane formed by reaction of
 (a) one or more monomeric or oligomeric poly- or di-isocyanates;
 (b) a first polyether polyol having a first molecular weight; and
 (c) an optional second polyether polyol having a second molecular weight lower than the first molecular weight; and (2) optionally, a polyisocyanurate formed by reaction of a monomeric or oligomeric poly- or di-isocyanate with water or other blowing agents;

(3) a particulate inorganic filler.

As indicated above, the polymer matrix composite material of the invention can have a variety of different uses. However, it is particularly suitable in structural applications, and in particular as an synthetic lumber. Accordingly, another specific embodiment of the invention relates to an synthetic lumber, comprising the polymer matrix composite material described above, and having a relatively porous material and a relatively non-porous toughening layer disposed on and adhered to the porous material.

It has been found that the process used to manufacture the polymer matrix composite material and the synthetic lumber formed therefrom can have an important impact on the appearance and properties of the resulting material, and thus on its commercial acceptability. Accordingly, another particular embodiment of the invention relates to a method of producing a polymer matrix composite, by:

(1) mixing a first polyether polyol having a first molecular weight and a second polyether polyol having a second molecular weight higher than the first molecular weight with a catalyst, optional water, and optional surfactant;

(2) optionally introducing reinforcing fibrous materials into the mixture;

(3) introducing inorganic filler into the mixture;

(4) introducing poly- or di-isocyanate into the mixture; and (5) allowing the exothermic reaction to proceed without forced cooling except to control runaway exotherm.

The materials of the invention, and the process for their preparation, are environmentally friendly. They provide a mechanism for reuse of particulate waste in a higher valued use, as described above. In addition, the process for making them optionally uses water in the formation of polyisocyanurate, which releases carbon dioxide as the blowing agent. The process thus avoids the use of environmentally harmful blowing agents, such as halogenated hydrocarbons.

DETAILED DESCRIPTION OF SPECIFIC EMBODIMENTS

As described above, one embodiment of the invention relates to a composite composition containing a polymeric matrix phase and a dispersed inorganic particulate phase, and which can contain other materials, such as reinforcing fibers, pigments and dyes, and the like. One of the desirable properties of the material is its self-skinning nature.

The polymeric phase desirably contains at least a polyurethane, generally considered to be a 2-part or thermosetting polyurethane. The polyurethane is formed by reacting a poly- or di-isocyanate (hereinafter "isocyanate"), particularly an aromatic diisocyanate, more particularly, a methylene diphenyl diisocyanate (MDI), with one or more polyether polyols, described in more detail below.

The MDI used in the invention can be MDI monomer, MDI oligomer, or a mixture thereof. The particular MDI used can be selected based on the desired overall properties, such as the amount of foaming, strength of bonding to the inorganic particulates, wetting of the inorganic particulates in the reaction mixture, strength of the resulting composite material, and stiffness (elastic modulus). Although toluene diisocyanate can be used, MDI is generally preferable due to its lower volatility and lower toxicity. Other factors that influence the particular MDI or MDI mixture used in the invention are viscosity (a low viscosity is desirable from an ease of handling standpoint), cost, volatility, reactivity, and content of 2,4 isomer. Color may be a significant factor for some applications, but does not generally affect selection of an MDI for preparing synthetic lumber.

Light stability is also not a particular concern for selecting MDI for use in the composite of the invention. In fact, the composite of the invention allows the use of isocyanate mixtures not generally regarded as suitable for outdoor use, because of their limited light stability. When used in the composite of the invention, these materials surprisingly exhibit excellent light stability, with little or no yellowing or chalking. Since isocyanate mixtures normally regarded as suitable for outdoor use (generally aliphatic isocyanates) are considerably more expensive than those used in this invention, the ability of the invention to use MDI mixtures represents a significant cost advantage.

Suitable MDI compositions for use in the invention include those having viscosities ranging from about 25 to about 200 cp at 25° C. and NCO contents ranging from about 30% to about 35%. Generally, isocyanates are used that provide at least 1 equivalent NCO group to 1 equivalent OH group from the polyols, desirably with about 5% to about 10% excess NCO groups. Suitable isocyanates include Bayer MRS-4, Bayer MR Light, Dow PAPI 27, Bayer MR5, Bayer MRS-2, and Rubinate 9415.

As indicated above, the isocyanate used in the invention is reacted with one or more polyols. In general, the ratio of isocyanate to polyol, based on equivalent weights (OH groups for polyols and NCO groups for isocyanates) is generally in the range of about 0.5:1 to about 1.5:1, more particularly from about 0.8:1 to about 1.1:1. Ratios in these ranges provide good foaming and bonding to inorganic particulates, and yields low water pickup, fiber bonding, heat distortion resistance, and creep resistance properties. However, precise selection of the desired ratio will be affected by the amount of water in the system, including water added per se as a foaming agent, and water introduced with other components as an "impurity."

The polyol or polyols used may be single monomers, oligomers, or blends. Mixtures of polyols can be used to influence or control the properties of the resulting polymer network. For example, mixtures of two polyols, one a low molecular weight, rigid (relative to the second) polyol and the other a higher molecular weight, more rubbery (relative to the first) polyol. The amount of rigid polyol is carefully controlled in order to avoid making the composite too brittle. An amount of flexible polyol of between about 5 wt % and about 20 wt %, more particularly around 15 wt %, based on the total weight of the flexible and rigid polyols being 100 wt %, has generally been found to be suitable. It is generally desirable to use polyols in liquid form, and generally in the lowest viscosity liquid form available, as these can be more easily mixed with the inorganic particulate material. So-called "EO" tipped polyols can be used; however their use is generally avoided where it is desired to avoid "frosting" of the polymer material when exposed to water.

In general, desirable polyols include polyether polyols, such as MULTRANOL (Bayer), including MULTRANOL 3400 or MULTRANOL 4035, ethylene glycol, diethylene glycol, triethylene glycol, dipropylene glycol, glycerol, 2-butyn-1,4-diol, neopentyl glycol, 1,2-propanediol, pentaerythritol, mannitol, 1,6-hexanediol, 1,3-butylene glycol, hydrogenated bisphenol A, polytetramethyleneglycolethers, polythioethers, and other di- and multi-functional polyethers and polyester polyethers, and mixtures thereof. The polyols need not be miscible, but should not cause compatibility problems in the polymeric composite.

As indicated above, the composite of the invention can desirably be prepared by mixing the polyols together (if multiple polyols are used), and then mixing them with various additives, such as catalysts, surfactants, and foaming agent, and then adding the inorganic particulate phase, then any reinforcing fiber, and finally the isocyanate.

One or more catalysts are generally added to control the curing time of the polymer matrix (upon addition of the isocyanate), and these may be selected from among those known to initiate reaction between isocyanates and polyols, such as amine-containing catalysts, such as DABCO and tetramethylbutanediamine, tin-, mercury- and bismuth-containing catalysts. To increase uniformity and rapidity of cure, it may be desirable to add multiple catalysts, including a catalyst that provides overall curing via gelation, and another that provides rapid surface curing to form a skin and eliminate tackiness. For example, a liquid mixture of 1 part tin-containing catalyst to 10 parts amine-containing catalyst can be added in an amount greater than 0 wt % and below about 0.10 wt % (based on the total reaction mixture) or less, depending on the length of curing time desired. Too much catalyst can result in overcuring, which could cause buildup of cured material on the processing equipment, or too stiff a material which cannot be properly shaped, or scorching; in severe cases, this can lead to unsaleable product or fire. Curing times generally range from about 5 seconds to about 2 hours.

A surfactant may optionally be added to the polyol mixture to function as a wetting agent and assist in mixing of the inorganic particulate material. The surfactant also stabilizes bubbles formed during foaming (if a foamed product is desired) and passivates the surface of the inorganic particulates, so that the polymeric matrix covers and bonds to a higher surface area. Surfactants can be used in amounts below about 0.5 wt %, desirably about 0.3 wt %, based on the total weight of the mixture. Excess amount of surfactant can lead to excess water absorption, which can lead to freeze/thaw damage to the composite material. Silicone surfactants have been found to be suitable for use in the invention. Examples include DC-197 and DC-193 (silicone-based, Air Products), and other nonpolar and polar (anionic and cationic) products.

Foaming agent may also be added to the polyol mixture if a foamed product is desired. While these may include organic blowing agents, such as halogenated hydrocarbons, hexanes, and other materials that vaporize when heated by the polyol-isocyanate reaction, it has been found that water is much less expensive, and reacts with isocyanate to yield $CO_2$, which is inert, safe, and need not be scrubbed from the process. Equally as important, $CO_2$ provides the type of polyurethane cells desirable in a foamed product (i.e., mostly open, but some closed cells), is highly compatible with the use of most inorganic particulate fillers, particularly at high filler levels, and is compatible with the use of reinforcing fibers. Other foaming agents will not produce the same foam structure as is obtained with water.

If water is not added to the composition, some foaming may still occur due to the presence of small quantities of water (around 0.2 wt %, based on the total weight of the reaction mixture) introduced with the other components as an "impurity." On the other hand, excessive foaming resulting from the addition of too much water (either directly or through the introduction of "wet" reactants or inorganic particulate materials) can be controlled by addition of an absorbent, such as UOP "T" powder.

The amount of water present in the system will have an important effect on the density of the resulting composite material. This amount generally ranges from about 0.10 wt % to about 0.40 wt %, based on the weight of polyol added, for composite densities ranging from about 20 lb/ft$^3$ to about 90 lb/ft$^3$.

Reinforcing fibers can also be introduced into the polyol mixture prior to introduction of the isocyanate. These can include fibers per se, such as chopped fiberglass, or fabrics or portions of fabrics, such as rovings or linear tows, or combinations of these. Typically, the reinforcing fibers range from about 0.125 in. to about 1 in, more particularly from about 0.25 in to about 0.5 in. The reinforcing fibers give the material added strength (flexural, tensile, and compressive), increase its stiffness, and provide increased toughness (impact strength or resistance to brittle fracture). Fabrics, rovings, or tows increase flexural stiffness and creep resistance. The inclusion of the particular polyurethane networks of the invention, together with the optional surfactants, and the inorganic particulate sizes used make the composite of the invention particularly and surprisingly well suited for inclusion of reinforcing fibers in foamed material, which normally would be expected to rupture or distort the foam bubbles and decrease the strength of the composite system.

In addition to inclusion of reinforcing fibers into the polyol mixture prior to polymerization, oriented axial fibers can also be introduced into the composite after extrusion, as the polymer exits the extruder and prior to any molding. The fibers (e.g., glass strings) can desirably be wetted with a mixture of polyol (typically a higher molecular weight, rigid polyol) and isocyanate, but without catalyst or with a slow cure catalyst, or with other rigid or thermosetting resins, such as epoxies. This allows the wetted fiber to be incorporated into the composite before the newly added materials can cure, and allows this curing to be driven by the exotherm of the already curing polymer in the bulk material.

Whether added before or after polymerization and extrusion, the composite material of the invention contains a polymeric matrix phase that is strongly bonded to the dispersed reinforcing fibers, increasing the strength and stiffness of the resulting material. This enables the material to be used as a structural synthetic lumber, even at relatively low densities (e.g., about 20 to about 60 lb/ft$^3$).

Pigment or dye can be added to the polyol mixture or can be added at other points in the process. The pigment is optional, but can help make the composite material more commercially acceptable, more distinctive, and help to hide any scratches that might form in the surface of the material. Typical examples of pigments include iron oxide, typically added in amounts ranging from about 2 wt % to about 7 wt %, based on the total weight of the reaction mixture.

The inorganic particulate phase is an important feature of the invention, and is typically present in amounts ranging between about 45 wt % to about 85 wt % of the total composition. Increasing the proportion of inorganic particulate can lead to increased difficulty in mixing, making the inclusion of a surfactant more desirable. The inorganic particulate material should have less than about 0.5 wt % water (based on the weight of the particulate material) in order to avoid excessive or uncontrolled foaming.

It is generally desirable to use particulate materials with a broad particle size distribution, because this provides better particulate packing, leading to increased density and decreased resin level per unit weight of composite. Since the inorganic particulate is typically some form of waste or scrap material, this leads to decreased raw material cost as well. Particles having size distributions ranging from about 0.0625 in to below 325 mesh have been found to be particularly suitable Suitable inorganic particulates can include ground glass particles, fly ash, bottom ash, sand, granite dust, and the like, as well as mixtures of these. Fly ash is desirable because it is uniform in consistency, contains some carbon (which can provide some desirable weathering properties to the product due to the inclusion of fine carbon particles which are known to provide weathering protection to plastics, and the effect of opaque ash particles which block UV light, and contains some metallic species, such as metal oxides, which are believed to provide additional catalysis of the polymerization reactions. Ground glass (such as window or bottle glass) absorbs less resin, decreasing the cost of the composite. A 1:1 mixture of coal fly ash and bottom ash has also been found to be suitable as the inorganic particulate composition. In general, fly ash having very low bulk density (e.g., less than about 40 lb/ft$^3$) and/or high carbon contents (e.g., around 20 wt % or higher) are less suitable, since they are more difficult to incorporate into the resin system, and may require additional inorganic fillers that have much less carbon, such as foundry sand, to be added. Fly ash produced by coal-fueled power plants, including Houston Lighting and Power power plants, fly and bottom ash from Southern California Edison plants (Navajo or Mohave), fly ash from Scottish Power/Jim Bridger power plant in Wyoming, and fly ash from Central Hudson Power plant have been found to be suitable for use in the invention.

The process for producing the composite material may be operated in a batch, semibatch, or continuous manner. Mixing may be conducted using conventional mixers, such as Banbury type mixers, stirred tanks, and the like, or may be conducted in an extruder, such as a twin screw, co-rotating extruder. When an extruder is used, additional heating is generally not necessary, especially if liquid polyols are used. In addition, forced cooling is not generally required, except for minimal cooling to control excessive or runaway exotherms.

For example, a multi-zone extruder can be used, with polyols and additives introduced into the first zone, inorganic particulates introduced in the second zone, and chopped fibers, isocyanate, and pigments introduced in the fifth zone. A twin screw, co-rotating, extruder (e.g. 100 mm diameter, although the diameter can be varied substantially) can be used, with only water cooling (to maintain room temperature), and without extruder vacuum (except for ash dust). Liquid materials can be pumped into the extruder, while solids can be added by suitable hopper/screw feeder arrangements. Internal pressure build up in such an exemplary arrangement is not significant.

Although gelation occurs essentially immediately, complete curing can take as long as 48 hours, and it is therefore desirable to wait at least that long before assessing the mechanical properties of the composite, in order to allow both the composition and the properties to stabilize.

As explained above, the composite material of the invention is advantageously used in structural products, including synthetic lumber. The synthetic lumber may be formed in a batch, semibatch, or continuous fashion. For example, in continuous operation, polymerized (and polymerizing) material leaving the extruder (after optional incorporation of post-extruder fibers, tows, or rovings) is supplied to a forming system, which provides dimensional constraint to the material, and can be used to pattern the surfaces of the resulting synthetic lumber with simulated woodgrain or other designs, in order to make the material more commercially desirable. For example, a conveyor belt system comprising 2, 4, or 6 belts made from a flexible resin having wood grain or other design molded therein can be used. One such suitable system is described in copending U.S. patent application Ser. No. 10/764,013, filed on even date herewith, the entire contents of which are incorporated herein by reference. Desirably, the belts are formed from a self-releasing rubber or elastomeric material so that it will not adhere to the polymer composite. Suitable belt materials include silicone rubber, oil impregnated polyurethane, or synthetic or natural rubbers, if necessary coated with a release agent, such as waxes, silicones, or fluoropolymers.

Representative suitable compositional ranges for synthetic lumber, in percent based on the total composite composition, are provided below:

| | |
|---|---|
| Rigid polyol | about 6 to about 18 wt % |
| Flexible polyol | 0 to about 10 wt % |
| Surfactant | about 0.2 to about 0.5 wt % |
| Skin forming catalyst | about 0.002 to about 0.01 wt % |
| Gelation catalyst | about 0.02 to about 0.1 wt % |
| Water | 0 to about 0.5 wt % |
| Chopped fiberglass | 0 to about 10 wt % |
| Pigments | 0 to about 6 wt % |
| Inorganic particulates | about 60 to about 85 wt % |
| Isocyanate | about 6 to about 20 wt % |
| Axial tows | 0 to about 6 wt %. |

The invention can be further understood by reference to the following non-limiting examples.

Example 1

A polymer composite composition was prepared by introducing 9.5 wt % rigid polyol (MULTRANOL 4035, Bayer), 0.3 wt % rubber polyol (ARCOL LG-56, Bayer), 0.3 wt % surfactant/wetting agent (DC-197, Air Products), 0.005 wt % film forming organic tin catalyst (UL-28/22, Air Products), 0.03 wt % amine gelation catalyst (33LV, Air Products), and 0.05 wt % water as foaming agent to the drive end of a 100 mm diameter twin screw co-rotating extruder with water cooling to maintain room temperature. At a point around 60% of the length of the extruder, 4.2 wt % chopped glass fibers (Owens Corning) with ¼ to ½ inch lengths were added, along with 4.0 wt % brown pigment (Interstar), 74 wt % fly ash (ISG), and 9.6 wt % isocyanate (MONDUR MR Light, Bayer). The extruder was operated at room temperature (75° F.), at 200 rpm for one hour. Following extrusion, 0.4 wt % of a resin mixture of rubbery polyol (ARCOL LG-56, Bayer), and isocyanate (MONDUR MR Light, Bayer) were added to the surface of the extruded material to provide a bonding adhesive for glass tows. The glass tows (Owens Corning) ¼ to ½ inch length were added in an amount of around 2 wt % to provide added rigidity, and were added just below the surface of the material produced by the extruder.

The resulting composite material was particularly useful as synthetic decking material.

Example 2

In a batch reactor, 16.4 wt % rigid polyol (Bayer 4035) was combined with 1.9 wt % flexible polyol (Bayer 3900), 0.2 wt % surfactant (DC-197), water, 3.2 wt % pigments, 0.0001 wt % UL-28 organic tin catalyst, and 0.1 wt % 33LV amine catalyst, and thoroughly mixed for 1 minute. 31.5 wt % Wyoming fly ash was then added and mixed for an additional 1 minute. Finally, 17.3 wt % isocyanate (1468A, Hehr), 0.9 wt % chopped brown fiber, 3.5 wt % chopped glass (0.25 in. diameter), and an additional 25.2 wt % Wyoming fly ash were added and mixed for 30 seconds. The resulting material had a resin content of 36%, a ratio of rigid to rubbery polyol of 90%, a solids content of 64%, a 10% excess isocyanate content, and a fiber content of 4.4%, all by weight based on the total composition unless noted otherwise. The resulting material was suitable for forming synthetic lumber boards.

Example 3

In a batch reactor, 16.4 wt % rigid polyol (Bayer 4035) was combined with 1.9 wt % flexible polyol (Bayer 3900), 0.2 wt % surfactant (DC-197), water, 3.2 wt % pigments, 3.5 wt % chopped glass (0.25 in. diameter), around 0.4 wt % Mohave bottom ash, 0.0001 wt % UL-28 organic tin catalyst, and 0.1 wt % 33LV amine catalyst, and thoroughly mixed for 1 minute. 31.5 wt % Wyoming fly ash was then added and mixed for an additional 1 minute. Finally, 17.3 wt % isocyanate (1468A, Hehr), 0.9 wt % chopped brown fiber, and an additional 25.2 wt % Wyoming fly ash were added and mixed for 30 seconds. The resulting material had a resin content of 36%, a ratio of rigid to rubbery polyol of 90%, a solids content of 64%, a 10% excess isocyanate content, and a fiber content of 4.4%, all by weight based on the total composition unless noted otherwise. The resulting material was suitable for forming synthetic lumber boards.

For each of Examples 2 and 3, water was added in amounts shown below (in percent based on total polyol added); physical properties of the resulting material were tested, and the results provided below. The 200 lb impact test was conducted by having a 200 lb man jump on an 18 inch span of synthetic lumber board, 2×6 inches supported above the ground from a height of about 1 ft in the air, and evaluating whether the board breaks.

(minus ash and chopped glass), and wet with a mixture of 49 wt % rigid polyol (MULTRANOL 4035), 0.098 wt % surfactant (DC-197), 0.20 wt % amine catalyst (33LV), and 49.59 wt % isocyanate (Hehr 1468A).

To the mold was added a synthetic lumber mixture, formed by combining 16.6 wt % rigid polyol (MULTRANOL 4035), 5.5 wt % flexible polyol (MULTRANOL 3900), 0.16 wt % surfactant (DC-197), 0.07 wt % water, 3.7 wt % pigments, 0.003 wt % organic tin catalyst (UL-28, Air Products), and 0.1 wt % amine catalyst (33LV), and mixing for 1 minute, then adding 26.4 wt % Wyoming fly ash, mixing for 1 minute, and finally adding 20.4 wt % isocyanate (MRS4, Bayer), 1.1 wt % chopped brown fiber, 3.4 wt % chopped 0.25 in. fiberglass, and 22.5 wt % Wyoming fly ash, and mixing for 30 seconds.

| Example | $H_2O$ (% of polyol) | Density ($lb/ft^3$) | Break Strength (psi) | 100 psi Deflection (in) | Hardness (Durometer C) | Flexural Strength (psi) | Flexural Modulus (psi) | 200 lb impact test (P/F) |
|---|---|---|---|---|---|---|---|---|
| 2 | 0.10 | 63 | 730 | 0.15 | 62 | 3129 | 118,331 | P |
| 2 | 0.23 | 59 | 650 | 0.15 | 57 | 2786 | 118,331 | P |
| 2 | 0.40 | 47 | 450 | 0.15 | 52 | 1929 | 118,331 | F |
| 3 | 0.10 | 63 | 810 | 0.15 | 62 | 3472 | 118,331 | P |

Example 4

Fiberglass rovings (Ahlstrom, 0.755 g/ft) or brown basalt rovings (0.193 g/ft) were positioned in a 24 inch mold for 2×4 inch synthetic lumber, and stabilized to limit movement relative to the mold surface (about 0.125 in. in from the mold surface) and to keep them taut. The rovings were applied dry, coated and pre-cured with the synthetic lumber composition The physical properties of the resulting boards were assessed, and are indicated below. Control boards were also prepared to different densities, and their physical properties evaluated as well. The axially oriented rovings greatly increased flexural strength, with little added weight. The rovings tend to have a more pronounced strengthening effect as the load on the material is increased.

| Roving type | Number of rovings | Roving coating | Density ($lb/ft^3$) | Flexural strength (psi) | Flexural Modulus @ 100 psi (Ksi) | Flexural Modulus @ 200 psi (Ksi) |
|---|---|---|---|---|---|---|
| Basalt | 10 | Dry | 41 | 1191 | 73 | 53 |
| Fiberglass | 10 | Pre-cured resin | 58 | 4000 | 188 | 135 |
| Fiberglass | 10 | Dry | 62 | 5714 | 339 | 169 |
| Basalt | 40 | Dry | 49 | 2465 | 96 | 101 |
| Basalt | 40 | Dry | 31 | 1650 | 62 | 165 |
| Fiberglass | 10 | Dry | 32 | 2717 | 37 | 57 |
| Fiberglass | 10 | Wet | 36 | 3533 | 77 | 93 |
| Fiberglass | 5 | Wet | 36 | 2410 | 64 | 71 |
| Fiberglass | 15 | Wet | 38 | 4594 | 171 | 80 |
| Fiberglass | 20 | Wet | 35 | 4356 | 84 | 80 |
| None | | | 55 | 1808 | 147 | 98 |
| None | | | 66 | 4724 | 121 | 100 |
| None | | | 68 | — | 169 | 135 |
| None | | | 59 | 2568 | 70 | 84 |
| None | | | 45 | 1319 | 82 | 62 |
| None | | | 35 | 1174 | 56 | 63 |
| None | | | 41 | 746 | 59 | 0 |

The synthetic lumber produced by the invention was found to have good fire retardant properties, achieving a flame spread index of 25, and to produce only small quantities of respirable particles of size less than 10 μm when sawn. It provides excellent compressive strength, screw and nail holding properties, and density. Extruded composite of the invention generally provides mechanical properties that are even better than those provided by molded composite.

What is claimed is:

1. A polymer composite material, comprising:
   (1) a polyurethane formed by reaction of a reaction mixture, comprising:
      (a) one or more monomeric or oligomeric poly- or di-isocyanates;
      (b) a first polyol comprising a polyether polyol, the first polyol having a first hydroxyl number in the range of 365 mg KOH/g to 395 mg KOH/g; and
      (c) a second polyol comprising a polyether polyol, the second polyol having a second hydroxyl number in the range of 33.8 mg KOH/g to 37.2 mg KOH/g, or from 56.2 mg KOH/g to 59.0 mg KOH/g, and forming the polyurethane, wherein the polyurethane is less rigid than a second polyurethane that would be formed by the reaction of the first polyol and the one or more monomeric or oligomeric poly- or di-isocyanates in the absence of the second polyol, and wherein the second polyol is between about 5 wt % and about 20 wt %, based on the total weight of the first and second polyols being 100 wt %; and
   (2) an inorganic particulate material comprising one or more of fly ash, bottom ash, particulate glass and granite tailings dispersed in the polymer matrix, the inorganic particulate material being 60 to 72 wt %, based on the total weight of the composite material.

2. The polymer composite material of claim 1, wherein the material is foamed.

3. The polymer composite material of claim 1, further comprising one or more inorganic fibers disposed throughout the only one polymer matrix.

4. The polymer composite material of claim 1, further comprising axially oriented fiber rovings disposed on, in, or beneath the surface of the composite.

5. The polymer composite material of claim 1, wherein the inorganic particulate material has a particle size distribution ranging from about 0.0625 in. to below about 325 mesh.

6. The polymer composite material of claim 1, wherein the inorganic particulate material contains less than about 0.5 wt % water.

7. The polymer composite material of claim 1, wherein the composite material is self-skinning.

8. The polymer composite material of claim 1, having a density ranging from about 20 to about 90 lb/ft$^3$.

9. The polymer composite material of claim 1, having a density ranging from about 20 to about 60 lb/ft$^3$.

10. The polymer composite material of claim 1, wherein the polymer matrix composite material additionally comprises a polyisocyanurate formed by reaction of the monomeric or oligomeric poly- or di-isocyanate with water.

11. The polymer composite material of claim 1, wherein the monomeric or oligomeric poly- or di-isocyanates comprise a methylene diphenyl diisocyanate (MDI).

12. The polymer composite material of claim 11, wherein the MDI has a viscosity ranging from about 25 to about 200 cp at 25° C.

13. The polymer composite material of claim 11, wherein the MDI has an NCO content ranging from about 30% to about 35%.

14. The polymer composite material of claim 11, wherein the MDI provides at least one equivalent NCO group to one equivalent OH group from the polyols.

15. The polymer composite material of claim 14, wherein the MDI provides about 5% to about 10% excess NCO groups.

16. The polymer composite material of claim 1, wherein the ratio of isocyanates to polyols, based on equivalent weights, is from about 0.5:1 to about 1.5:1.

17. The polymer composite material of claim 1, wherein the ratio of isocyanates to polyols, based on equivalent weights, is from about 0.8:1 to about 1.1:1.

18. The polymer composite material of claim 1, wherein the second polyol is about 15 wt %, based on the total weight of the first and second polyols being 100 wt %.

19. The polymer composite material of claim 3, wherein the one or more inorganic fibers disposed in the polymer matrix are present in amounts less than 10% by weight, based on the total weight of the material.

20. The polymer composite material of claim 1, wherein the first and the second polyols are non-EO tipped polyols.

21. The polymer composite material of claim 1, wherein the first polyol is about 6 to about 18 wt % and the second polyol is greater than 0 to about 10 wt %, based on the total weight of the composite material.

22. The polymer composite material of claim 1, wherein the composite material has a flexural strength at least 1929 psi.

23. The polymer composite material of claim 1, wherein the composite material has a flexural modulus of about 118,331 psi.

24. The polymer composite material of claim 1, wherein the inorganic particulate material is one or more of a fly ash and bottom ash.

25. The polymer composite material of claim 24, wherein the inorganic particulate material is present in an amount from about 80 wt % to about 85 wt %, based on the total weight of the composite material.

26. The polymer composite material of claim 25, having a density ranging from about 20 to about 41 lb/ft$^3$.

27. The polymer composite material of claim 25, having a density ranging from about 31 to about 38 lb/ft$^3$.

28. The polymer composite material of claim 24, wherein the inorganic particulate material is present in an amount from greater than 80 wt % to about 85 wt %, based on the total weight of the composite material.

29. The polymer composite material of claim 24, having a flexural strength of at least 1319 psi.

30. The polymer composite material of claim 24, having a flexural strength from 1319 psi to 1929 psi.

31. The polymer composite material of claim 27, having a flexural strength of from 1319 psi to 1650 psi.

32. The polymer composite material of claim 24, having a density ranging from about 20 to about 41 lb/ft$^3$.

33. The polymer composite material of claim 24, having a density ranging from about 31 to about 38 lb/ft$^3$.

34. The polymer composite material of claim 24, wherein the material is foamed.

35. The polymer composite material of claim 1, wherein the composite material comprises extruded composite material.

36. The polymer composite material of claim 1, wherein the composite material comprises extruded polyurethane and inorganic particulate material.

37. The polymer composite material of claim 1, wherein the second polyol is between about 5 wt % to about 15 wt %, based on the total weight of the first and second polyols being 100 wt %.

38. The polymer composite material of claim 1, wherein the second polyol is between about 10 wt % to about 20 wt %, based on the total weight of the first and second polyols being 100 wt %.

39. The polymer composite material of claim 1, wherein the second polyol is between about 15 wt % to about 20 wt %, based on the total weight of the first and second polyols being 100 wt %.

40. A polymer composite material comprising:
   (1) a polyurethane formed by reaction of a reaction mixture, comprising:
      (a) one or more monomeric or oligomeric poly- or di-isocyanates;
      (b) a first polyol comprising a polyether polyol, the first polyol having a first hydroxyl number in the range of 365 mg KOH/g to 395 mg KOH/g; and
      (c) a second polyol comprising a polyether polyol, the second polyol having a second hydroxyl number in the range of 33.8 mg KOH/g to 37.2 mg KOH/g, or 56.2 mg KOH/g to 59 mg KOH/g, and forming the polyurethane, wherein the polyurethane is less rigid than a second polyurethane that would be formed by the reaction of the first polyol and the one or more monomeric or oligomeric poly- or di-isocyanates in the absence of the second polyol, and wherein the second polyol is between about 5 wt % and about 20 wt %, based on the total weight of the first and second polyols being 100 wt %; and
   (2) 60 to 72 wt % of an inorganic particulate material, based on the total weight of the composite material.

41. The polymer composite material of claim 40, wherein the first polyol is in an amount of about 6 to about 18 wt %, and the second polyol is an amount of up to 10 wt %, based on the total weight of the composite material.

42. The polymer composite material of claim 40, wherein the composite material comprises extruded polyurethane and inorganic particulate material.

43. The polymer composite material of claim 40, wherein the first polyol has a first molecular weight, and the second polyol has a second molecular weight, wherein the first molecular weight is less than the second molecular weight.

* * * * *